TRANSISTORIZED PHASE DISCRIMINATOR

Filed March 31, 1958

INVENTORS
BEN A. HARRIS
CLYDE W. BAXTER
NEIL L. WISEMAN
BY Richard G. Stahr
ATTORNEY United States Patent Office 3,015,737

Patented Jan. 2, 1962

3,015,737
TRANSISTORIZED PHASE DISCRIMINATOR

Ben A. Harris, Clyde W. Baxter, and Neil L. Wiseman, Rochester, N.Y., assignors to General Dynamics Corporation, Rochester, N.Y., a corporation of Delaware Filed Mar. 31, 1958, Ser. No. 725,058
10 Claims. (Cl. 307—88.5)

Figure 1:
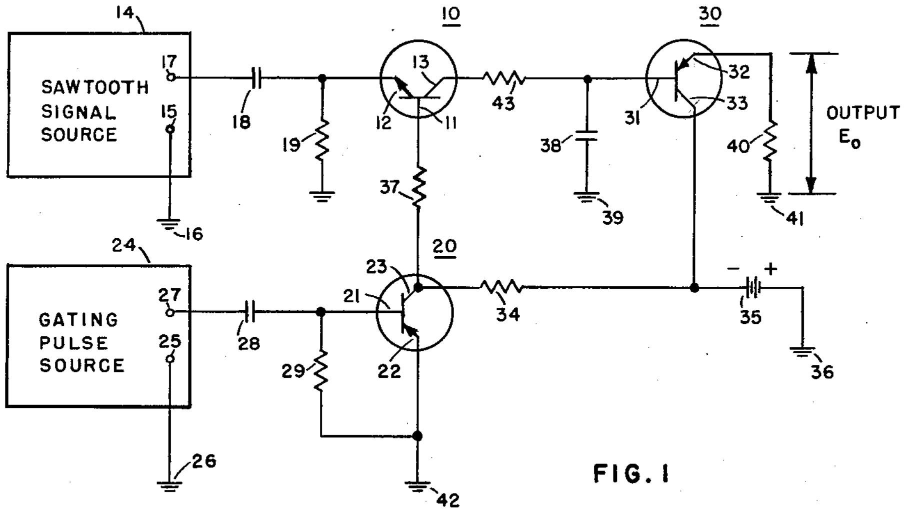

The present invention relates generally to discriminator circuits and, more specifically, to transistorized discriminator circuits of the type which produce a direct current potential level proportionate to the phase relationship between two separate signal potentials.

Most phase discriminators now in use, generally compare two signals over the complete cycle of each signal and produce direct current output potentials which may be continuously varying in magnitude as the phase relationship between the two signals change through their respective cycles. The direct current output potential of this type discriminator circuit may also reverse polarities as the phase relationship between the two signals become less or greater than 180 degrees.

Certain applications, however, may require that the two signals be compared only periodically and that a direct current output potential level of a magnitude proportional to the phase relationship between the two signals only at the time they are compared be produced and maintained at that level in a charge storage element until the next time the signals are again compared.

It is, therefore, an object of this invention to provide an improved transistorized phase discriminator circuit.

Another object of this invention is to provide an improved phase discriminator circuit employing only solid state components.

Another object of this invention is to provide an improved transistorized phase discriminator circuit which produces a direct current potential level proportional to the phase relationship between two signals and retains this output potential level in a charge storage device.

In accordance with this invention, a saw-tooth reference signal potential is applied to the input electrode of a first transistor in a polarity which conditions this transistor for conduction while a randomly occurring gating signal pulse is applied to the control electrode of a second transistor in a polarity which turns this transistor "on," permitting conduction therethrough over the duration of the gating signal pulse. To bias the first transistor "off" at all times, except during the occurrence of the gating signal pulse, the collector potential of the second transistor is applied to the control electrode of the first transistor. At the occurrence of a gating signal pulse, the second transistor conducts, reducing its collector potential and, hence, the base bias potential of the first transistor to substantially ground thereby turning the first transistor "on" over the duration of the gating signal pulse. During the time the first transistor is turned "on," its collector potential comes to the potential of the saw-tooth reference signal at that time. A charge storage device which is connected between the collector of the first transistor and a point-of-reference potential, therefore, assumes a direct current charge level of a magnitude substantially equal to the amplitude of the saw-tooth reference signal potential at the time of the occurrence of the gating signal pulse where it is retained until the occurrence of the next gating signal pulse. In this manner, therefore, a direct current potential level is produced which is proportionate to the phase relationship between the reference and gating signals.

Figure 2:
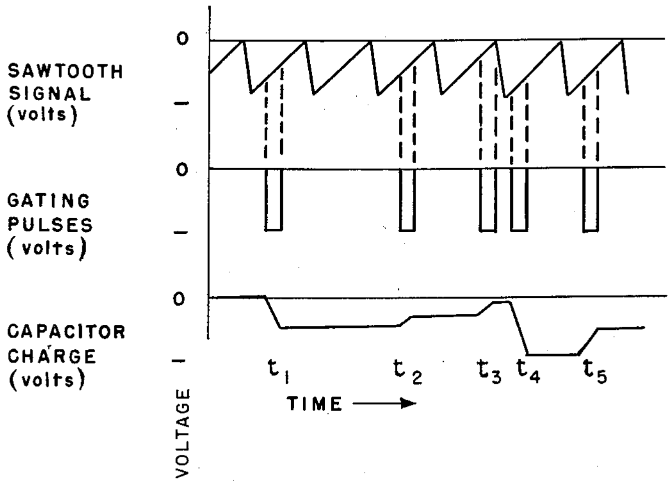

For a better understanding of the present invention, together with further objects, advantages and features thereof, reference is made to the following description and accompanying drawings, in which:

FIGURE 1 is a preferred embodiment of the circuit of the present invention; and, FIGURE 2 graphically illustrates the various waveforms applicable.

In FIGURE 1, two transistor devices, each represented by their accepted schematic synbol, are shown at 10 and 20. The semi-conducting body of transistor 10 has a control or base electrode 11, an input or emitter electrode 12, and an output or collector electrode 13 in contact therewith. The semi-conducting body of transistor 20 has a control or base electrode 21, an input or emitter electrode 22, and an output or collector electrode 23 in contact therewith.

A saw-tooth signal source, the details of which are well known in the art and form no part of this invention, is indicated in block form at 14. One terminal 15 of signal source 14 is connected to a point-of-reference potential 16. The other terminal 17 is resistance-capacitance coupled through capacitor 18 and resistor 19 to the emitter electrode 12 of transistor 10, thereby conditioning this transistor for conduction. To satisfy the base-emitter bias requirements of an NPN transistor, this saw-tooth signal potential must be negative in respect to the base bias potential.

A gating signal pulse source, the details of which are well known in the art and form no part of this invention, is indicated in block form at 24. One terminal 25 of this pulse source is connected to a point-of-reference potential 26. The other terminal 27 of this source is resistance-capacitance coupled to the base electrode 21 of transistor 20 through capacitor 28 and resistor 29. To satisfy the base-emitter bias requirements of a PNP transistor, this gating signal pulse must be negative-going.

To supply the proper operating potential of transistor 20, a supply source 35 is shown. As the collector of a PNP transistor requires a negative bias potential, the positive side of potential source 35 is connected to point-of-reference potential 36 while the negative side is connected to the collector 23 of transistor 20 through resistor 34. Resistor 34 and the emitter-collector circuit of transistor 20, therefore, comprises a voltage divider network across which bias potential source 35 is connected. To provide a bias potential for base 11 of transistor 10, the potential across transistor 20 is applied to the base 11 of transistor 10 through current limiting resistor 37. As this potential is negative while transistor 20 is non-conducting and is of a magnitude substantially equal to the potential of source 35, transistor 10 is, therefore, turned "off" during the periods transistor 20 is in a condition of non-conduction. To accomplish this, of course, the negative bias potential upon the base 11 of transistor 10 must be more negative than the negative saw-tooth reference potential applied to the emitter 12 of transistor 10.

Assume for the present that a signal potential is being applied to emitter 12 of transistor 10 from source 14 and that no gating signal pulse is applied to base 21 of transistor 20 from source 24. Under these conditions, transistor 20 will be turned "off" in that its base and emitter are at the same potential which does not satisfy the base-emitter bias potential requirements of a PNP transistor. The negative saw-tooth reference signal being applied to the emitter 12 of transistor 10 is also ineffective at this time in that the more negative potential applied to the base 11 through resistor 37 turns this transistor "off" in that the base-emitter bias potential requirements of an NPN transistor are not satisfied.

As a randomly occurring negative-going gating pulse appears from source 24 and is applied to the base 21 of transistor 20, the base-emitter bias requirements of a PNP transistor are satisfied. Therefore, transistor 20 will conduct at this time, which reduces its collector potential to virtually ground. Since the base bias potential of transistor 10 is taken across transistor 20, the ground potential upon the base 11 of transistor 10 at this time turns transistor 10 "on" over the duration of the gating signal pulse.

Connected across the collector 13 of transistor 10 through current limiting resistor 43 and a point-of-reference potential 39 is a capacitor 38. As transistor 10 is turned "on" over the duration of the gating signal pulse in a manner as previously described, the saw-tooth signal source is connected to capacitor 38 which is charged, negative in respect to ground, to a direct current potential level of a magnitude substantially equal to the amplitude of the saw-tooth signal potential at this time. As the gating pulse is removed from the base 21, transistor 20 becomes non-conductive for the reasons as outlined before, which re-establishes the "off" potential bias on base 11 thereby rendering transistor 10 also non-conductive. The direct current charge on capacitor 38, however, is maintained until the occurrence of the next gating signal pulse, at which time it again assumes a direct current potential substantially equal to the saw-tooth reference signal potential amplitude at that time. The charge on capacitor 38 is prevented from leaking off through transistor 10 because of the back-bias present on its base 11 during the periods between the occurrence of the gating signal pulses.

So that the charge potential appearing on capacitor 38 may be used for any desirable purpose and at the same time avoid an intolerable charge drain, an emitter-follower transistor 30 is connected across capacitor 38 as shown. With this arrangement, the apparent impedance across the capacitor is extremely high, being in the neighborhood of approximately 600,000 ohms. The emitter-collector current of transistor 30 develops an output potential $E_o$ across output resistor 40, one end of which is connected to emitter 32 of transistor 30, while the other end is connected to a point-of-reference potential 41. As the emitter-collector current flow of transistor 30 is proportional to the charge upon capacitor 38, the output voltage $E_o$ is a function of the direct current level stored therein.

Referring now to FIGURE 2, there is graphically illustrated the saw-tooth reference potential, the randomly occurring gating potential pulse, and the resultant $E_o$ output potential of the circuit of this invention. Upon the occurrence of the first gating signal pulse, capacitor 38 is connected to the saw-tooth reference signal source 14, as previously described, with the result that it assumes a direct current charge substantially equal to the amplitude of the potential of the saw-tooth signal potential amplitude at that time as is shown at $t_1$. At the occurrence of the next gating signal pulse, there has been a slight shift toward the right in the phase relationship between the saw-tooth reference signal and the gating signal pulse as shown at $t_2$. At this time, capacitor 38 again assumes a direct current charge substantially equal to the amplitude of the saw-tooth reference signal potential at $t_2$, as indicated. With the occurrence of the next gating signal pulse at $t_3$, the phase relationship between the reference signal and the gating signal pulses has drifted farther to the right. At this time the amplitude of the reference signal potential is nearly zero and again the capacitor 38 assumes this direct current charge as shown. This same analogy, of course, may be followed through times $t_4$ and $t_5$, as indicated.

From this, it may be seen that the magnitude of the direct current charge on capacitor 38 is proportional to the phase relationship between the saw-tooth reference signal potential and the gating signal pulses.

While the circuit of this invention has herein been described on the basis of only a single polarity relationship, it is to be understood that the transistor types may be reversed, with a reversal of the various polarity relationships, producing an identical end result. Similarly, transistor 10 may be replaced by a symmetrical or bilateral transistor unit.

While a preferred embodiment of the discriminator circuit of this invention has been shown and described, it will be obvious to those skilled in the art that various modifications and substitutions may be made without departing from the spirit of the invention which is to be limited only within the scope of the appended claims.

What is claimed is:

1. A phase discriminator of the type which produces a direct current potential level proportional to the relative phase relationship between a saw-tooth reference signal and randomly occurring gating signal pulses comprising a first control device having at least a first input electrode, a first output electrode, and a first control electrode; a second control device having at least a second input electrode, a second output electrode, and a second control electrode; a source of saw-tooth reference signal potential; first coupling circuit means for applying said saw-tooth reference signal potential to said first input electrode in a polarity for conditioning said first control device for conduction; a voltage divider network including said second control device; a bias potential source connected across said voltage divider network; direct current coupling means for applying the potential across said second control device to said first control electrode in a polarity for biasing said first control device off; a source of gating pulses; second coupling circuit means for applying randomly occurring gating signal pulses from said source of gating pulses across said second input and control electrodes in a polarity for producing conduction through said second control device over the duration of the gating signal pulse thereby reducing the bias potential applied to the said first control electrode for permitting said first control device to translate said saw-tooth reference signal over the duration of the gating signal pulse; and charge storage means connected between said first output electrode and a point-of-reference potential for storing a charge substantially equal to the amplitude of the saw-tooth reference signal potential at the time of the occurrence of a gating signal pulse and maintaining said charge until the occurrence of the next gating signal pulse whereby a direct current potential level is produced which is proportional to the phase relationship between said reference and gating signals.

2. A phase discriminator of the type as described in claim 1 in which said charge storage means is a capacitor.

3. A phase discriminator of the type which produces a direct current potential level proportional to the relative phase relationship between a saw-tooth reference signal and randomly occurring gating signal pulses comprising a first control device having at least a first input electrode, a first output electrode, and a first control electrode; a second control device having at least a second input electrode, a second output electrode, and a second control electrode; a source of saw-tooth reference signal potential; first coupling circuit means for applying said saw-tooth reference signal potential to said first input electrode in a polarity for conditioning said first control device for conduction; a voltage divider network including said second control device; a bias potential source connected across said voltage divider network; direct current coupling means for applying the potential across said second control device to said first control electrode in a polarity for biasing said first control device off; a source of gating pulses; second coupling circuit means for applying randomly occurring gating signal pulses from said source of gating pulses across said second input and control electrodes in a polarity for producing conduction through said second control device over the duration of the gating signal pulse thereby reducing the bias potential applied to the said first control electrode for permitting said first control device to translate said saw-tooth reference signal over the duration of the gating signal pulse; charge storage means connected between said first output electrode and a point-of-reference potential for storing a charge substantially equal to the amplitude of the saw-tooth reference signal potential at the time of the occurrence of a gating signal pulse and maintaining said charge until the occurrence of the next gating signal pulse whereby a direct current potential level is produced which is proportional to the phase relationship between said reference and gating signals, and high impedance circuit means connected across said charge storage means for permitting the use of said stored charge without an intolerable charge drain.

4. A phase discriminator of the type described in claim 3 in which said charge storage means is a capacitor.

5. A discriminator device of the type described in claim 3 in which said high impedance circuit means is an emitter follower circuit.

6. A transistor phase discriminator of the type which produces a direct current potential level proportional to the relative phase relationship between a saw-tooth reference signal and randomly occurring gating signal pulses comprising a first transistor device having at least a first emitter electrode, a first collector electrode, and a first base electrode; a second transistor device having at least a second emitter electrode, a second collector electrode, and a second base electrode; a source of saw-tooth reference signal potential; first coupling circuit means for applying said saw-tooth reference signal potential to said first emitter electrode in a polarity for conditioning said first transistor device for conduction; a voltage divider network including said second transistor device; a bias potential source connected across said voltage divider network; direct current coupling means for applying the potential across said second transistor device to said first base electrode in a polarity for biasing said first transistor device off; a source of gating pulses; second coupling circuit means for applying randomly occurring gating signal pulses from said source of gating pulses across said second emitter and base electrodes in a polarity for producing conduction through said second transistor device over the duration of the gating signal pulse thereby reducing the bias potential applied to the said first base electrode for permitting said first transistor device to translate said saw-tooth reference signal over the duration of the gating signal pulse; and charge storage means connected between said first output collector and a point-of-reference potential for storing a charge substantially equal to the amplitude of the saw-tooth reference signal potential at the time of the occurrence of a gating signal pulse and maintaining said charge until the occurrence of the next gating signal pulse whereby a direct current potential level is produced which is proportional to the phase relationship between said reference and gating signals.

7. A transistor phase discriminator of the type as described in claim 6 in which said charge storage means is a capacitor.

8. A transistor phase discriminator of the type which produces a direct current potential level proportional to the relative phase relationship between a saw-tooth reference signal and randomly occurring gating signal pulses comprising a first transistor device having at least a first emitter electrode, a first collector electrode, and a first base electrode; a second transistor device having at least a second emitter electrode, a second collector electrode, and a second base electrode; a source of saw-tooth reference signal potential; first coupling circuit means for applying said saw-tooth reference signal potential to said first emitter electrode in a polarity for conditioning said first transistor device for conduction; a voltage divider network including said second transistor device; a bias potential source connected across said voltage divider network; direct current coupling means for applying the potential across said second transistor device to said first base electrode in a polarity for biasing said first transistor device off; a source of gating pulses; second coupling circuit means for applying randomly occurring gating signal pulses from said source of gating pulses across said second emitter and base electrodes in a polarity for producing conduction through said second transistor device over the duration of the gating signal pulse thereby reducing the bias potential applied to the said first base electrode for permitting said first transistor device to translate said saw-tooth reference signal over the duration of the gating signal pulse; charge storage means connected between said first output electrode and a point-of-reference potential for storing a charge substantially equal to the amplitude of the saw-tooth reference signal potential at the time of the occurrence of a gating signal pulse and maintaining said charge until the occurrence of the next gating signal pulse whereby a direct current potential level is produced which is proportional to the phase relationship between said reference and gating signals and high impedance circuit means connected across said charge storage means for permitting the use of said stored charge without an intolerable charge drain.

9. A transistor discriminator device of the type described in claim 8 in which said charge storage means is a capacitor.

10. A transistor discriminator device of the type described in claim 8 in which said high impedance circuit means is an emitter follower circuit.

References Cited in the file of this patent

UNITED STATES PATENTS

| | | |
|---|---|---|
| 2,521,710 | Gallay | Sept. 2, 1950 |
| 2,793,347 | Clark | May 21, 1957 |
| 2,799,784 | Harris et al. | July 16, 1957 |
| 2,823,322 | Trousdale | Feb. 11, 1958 |
| 2,829,281 | Overbeek | Apr. 1, 1958 |
| 2,851,220 | Kimes | Sept. 9, 1958 |
| 2,858,456 | Royer et al. | Oct. 28, 1958 |
| 2,880,331 | MacSorley | Mar. 31, 1959 |
| 2,956,175 | Bothwell | Oct. 11, 1960 |
| 2,957,137 | Robinson | Oct. 18, 1960 |